Patented Oct. 20, 1953

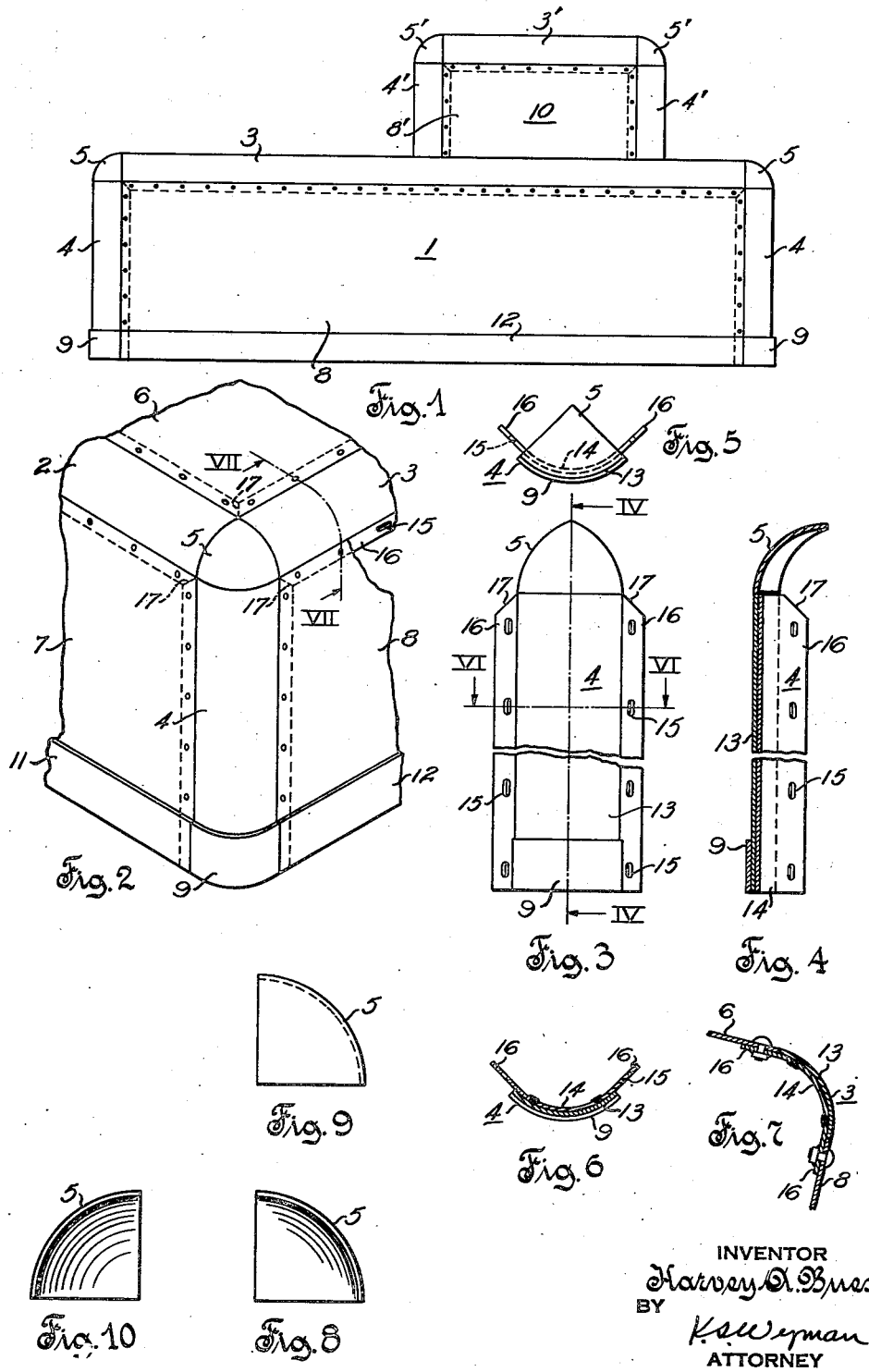

2,656,064

UNITED STATES PATENT OFFICE 2,656,064

FABRICATED CASING STRUCTURE

Harvey A. Bues, Milwaukee, Wis., assignor to Allis-Chalmers Manufacturing Company, Milwaukee, Wis., a corporation of Delaware Application March 29, 1946, Serial No. 658,320

1 Claim. (Cl. 220—4)

This invention relates to a fabricated casing or enclosure of general application although of particular utility for applications wherein the casing is to be assembled on the job and wherein it is necessary or desirable to initially assemble the casing in the shop and then disassemble same prior to shipping.

And the present invention is directed toward and has as an object the provision of a fabricated casing presenting a smooth exterior surface and embodying parts constructed and combined in a manner permitting the casing to be readily assembled and disassembled with a minimum of time, effort and skill.

Another object of the present invention is to provide an improved fabricated casing embodying corner members constructed and combinable with plain wall members and with each other in a manner minimizing the number of separable parts and in a manner presenting rounded corners each having an exterior surface substantially flush with the exterior surfaces of the wall and corner members joined therewith.

Still another object of the present invention is to provide an improved fabricated casing embodying corner members constructed and combinable with plain wall members and with each other in a manner such that the corner members function as a rigid supporting frame and such that any wall member may be readily removed in order to gain access to the interior of the casing.

Still another object of the present invention is to provide an improved corner member or part materially simplifying the assembly and disassembly of a fabricated casing.

More particularly the present invention is directed toward and has as a further object the provision of an improved fabricated casing wherein elongated corner members are formed to present a generally quarter-round main outer surface portion and generally tangential plain marginal side surface portions depressed relative to said main surface portion, wherein a pair of plain generally rectangular walls each have a marginal edge portion thereof detachably united with a corner member in overlapping relation with respect to the depressed marginal side surface portions thereof, wherein an additional and similar corner member is similarly secured to a marginal edge of each wall with the adjacent ends of the additional corner member joined in part with each other and in part with the adjacent end of the first mentioned corner member, and wherein a quarter of a half-sphere-like part having a curvature conforming with that of the main outer surface portions of the corner members is disposed between the in part joined ends of such members in substantially flush edge-abutting relation thereto.

The construction and utility of a fabricated casing structure and/or of parts thereof embodying the invention will become readily apparent as the disclosure progresses and particularly points out additional objects and advantages considered of special importance. And accordingly the present invention may be considered as consisting of the various elements and parts constructed and/or combined as hereinafter more fully set forth in the detailed description and appended claims, reference being had to the accompanying drawing illustrating one embodiment of the invention and in which:

Fig. 1 is a side view of a generally rectangular casing constructed in accordance with the present invention;

Fig. 2 is an enlarged perspective view of a corner portion of the casing shown in Fig. 1 with a portion of one side wall thereof broken away;

Fig. 3 is a view of the vertical corner member shown in Fig. 2;

Fig. 4 is a section taken on line IV—IV of Fig. 3;

Fig. 5 is a top view of the member shown in Fig. 3;

Fig. 6 is a view taken on line VI—VI of Fig. 3;

Fig. 7 is a view taken on line VII—VII of Fig. 2;

Fig. 8 is a side view of the hollow quarter-hemisphere corner closing element shown attached to the upper end of the vertical corner member shown in Figs. 3 and 4;

Fig. 9 is a top plan view of the element shown in Fig. 8; and

Fig. 10 is a left side view of the element shown in Fig. 8.

In the illustrated embodiment of the invention, the casing comprises a generally rectangular main portion 1 formed by horizontal transversely rounded corner members 2 and 3, a vertical transversely rounded corner member 4 having a quarter of a hollow half sphere-like element 5 secured in edge-abutting relation to the top end thereof, a plain top wall 6, and plain side walls 7 and 8. If desired, the rigidity of the floor or ground engaging edges of the main casing may be increased by thickening the lower end portion of member 4 at 9 and the lower edge portions of the walls 7 and 8 at 11 and 12, respectively. In addition, the casing is provided with a turret-like top portion 10 formed with generally similar parts designated 3', 4', 5' and 8'.

Except for the thickened lower end portion of member 4, the elongated members 2, 3 and 4 are similar and each is preferably formed (see Figs. 4-7, inclusive) by a pair of transversely arcuate strips of equal length and unequal width rigidly united in concentric nested relation with the concave surface of narrow strip 13 abutting the convex surface of wide strip 14 and leaving exposed marginal side edge portions 16 thereof disposed in generally tangential relation with respect to the adjacent side edge portions of strip 13. The marginal edge portions 16 of strip 14 are apertured as indicated at 15 to receive bolts or other suitable fastenings for securing the marginal edges of a wall thereto. Insofar as the broad aspects of the invention are concerned, it is immaterial whether the corner members 2, 3 and 4 are formed as just described or in some other manner so long as each such member presents a plain rounded main outer surface portion and generally tangential plain marginal side surface portions depressed relative to the main surface portion a distance substantially equal to the thickness of the marginal edge portions of walls 6, 7 and 8. The end edges of the rounded main portion of members 2, 3 and 4 are at a right angle to the side edges thereof with the exception that the adjacent ends of the depressed side portions are cut away at an angle as indicated at 17 for edge-abutting engagement with a like portion of an adjacent member.

Element 5 has a curvature, and preferably a thickness, conforming with that of the generally quarter-round portion of the similar corner members 2, 3 and 4. In assemblying the casing, element 5 is preferably first rigidly united in any suitable manner, as by welding, with an end of one of the corner members (in this case member 4) in flush edge-abutting relation with respect to the generally quarter-round portion thereof. And the assembly may then be readily completed by rigidly detachably uniting corresponding marginal edge portions of walls 7 and 8 to the depressed marginal side edge portions 16 of corner member 4 in overlapping relation thereto as indicated in the drawing, by next similarly uniting a depressed marginal side edge portion of member 2 and the corresponding marginal side edge portion of member 3 with the marginal top edge portions of walls 7 and 8, respectively, and then similarly uniting two adjoining marginal edge portions of wall 6 with the exposed marginal side edge portions of members 2 and 3.

The assembly procedure above described may be varied in obvious respects as any rational assembly of the various elements hereinbefore described provides a casing wherein the walls 6, 7 and 8 are in edge-abutting and substantially flush relation with respect to the side edges and plain outer surfaces of the rounded corner members united therewith and wherein the element 5 is disposed in edge-abutting and substantially flush relation with respect to the adjacent ends of the rounded portions of the corner members. In addition, it should now be obvious, that it is usually preferable to detachably unite the corner members and walls as herein indicated and that when thus united the casing can be readily wholly disassembled and then reassembled with a minimum of time, effort and skill, and that one or more of the walls can be readily removed, if desired, in order to gain access to the interior of the casing.

The elongated rounded corner members, when united with wall members as herein shown and described, in fact provides an extremely rigid, smooth-surfaced construction without the use of additional bracing or reinforcing elements. In forming a generally rectangular casing it is preferable, in the interest of simplicity and reduced costs, to form the elongated corner members as quarter-round parts and to form the elements 5 by quartering a hollow hemisphere having a radius and a radial thickness conforming with the radius and radial thickness of the elongated quarter-round corner members. However, it is often desirable to vary the curvature and/or thickness of the rounded or convex portion of the corner members and of the gap closing element disposed between the adjacent ends of three such members in order to make the casing either more or less rigid and in order to conform with the selected angularity of the elongated corner members and walls. And it should therefore be understood that it is not intended to limit the invention to the exact construction and/or combination of elements herein shown and described for purposes of illustration, as various modifications within the scope of the appended claim may occur to persons skilled in the art.

It is claimed and desired to secure by Letters Patent:

A corner member for a fabricated casing comprising a pair of transversely arcuate strips of equal length and unequal width rigidly united in concentric nested relation with the concave surface of the narrow strip abutting the convex surface of the wide strip and leaving exposed marginal side edge portions thereof disposed in generally tangential relation with respect to the adjacent side edge portions of said narrow strip, and a hollow three-edge part having a plain curved outer surface conforming with the curvature of said narrow strip and being rigidly secured to an end of said pair of rigidly united strips in edge abutting and substantially flush relation with respect to the end edge and convex outer surface portion of said narrow strip.

HARVEY A. BUES.

References Cited in the file of this patent

UNITED STATES PATENTS

| Number | Name | Date |
| --- | --- | --- |
| 525,488 | Crouch | Sept. 4, 1894 |
| 537,119 | Levey | Apr. 9, 1895 |
| 1,887,761 | Hauser | Nov. 15, 1932 |
| 2,155,871 | Piker | Apr. 25, 1939 |
| 2,337,660 | Hultberg | Dec. 28, 1943 |
| 2,400,150 | Jones et al. | May 14, 1946 |

FOREIGN PATENTS

| Number | Country | Date |
| --- | --- | --- |
| 351 | Great Britain | 1912 |